US011310183B2

(12) United States Patent
Samaranayake (10) Patent No.: US 11,310,183 B2
(45) Date of Patent: *Apr. 19, 2022

(54) DYNAMIC CONFIGURATION OF APPLICATION COMPONENT TILES (71) Applicant: Snap Inc., Santa Monica, CA (US)

(72) Inventor: Chamal Samaranayake, Venice, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/948,849

(22) Filed: Oct. 2, 2020

(65) Prior Publication Data
US 2021/0126884 A1 Apr. 29, 2021

Related U.S. Application Data (63) Continuation of application No. 15/002,228, filed on Jan. 20, 2016, now Pat. No. 10,817,156, which is a
(Continued)

(51) Int. Cl.
H04L 12/58 (2006.01)
G06F 9/451 (2018.01)
G06F 3/0484 (2013.01)
G06F 3/0488 (2013.01)
G06F 3/0481 (2013.01)
H04L 51/00 (2022.01)
(Continued)

(52) U.S. Cl.
CPC .......... H04L 51/16 (2013.01); G06F 3/04847 (2013.01); G06F 9/451 (2018.02); G06F 3/0481 (2013.01); G06F 3/0488 (2013.01); G06F 3/04817 (2013.01); G06F 3/04883 (2013.01)

(58) Field of Classification Search
CPC .. G06F 3/0481; G06F 3/04817; G06F 3/0488; G06F 3/04883; G06F 9/451; H04L 51/16
See application file for complete search history.

(56) References Cited

U.S. PATENT DOCUMENTS 5,734,823 A 3/1998 Saigh
5,754,939 A 5/1998 Herz et al.
(Continued)

FOREIGN PATENT DOCUMENTS

CA 2887596 A1 7/2015
EP 2418606 A2 2/2012
(Continued)

OTHER PUBLICATIONS

U.S. Appl. No. 14/274,627 U.S. Pat. No. 9,276,886, filed May 9, 2014, Apparatus and Method for Dynamically Configuring Application Component Tiles.
(Continued)

Primary Examiner — Eric J. Bycer
(74) Attorney, Agent, or Firm — Schwegman Lundberg & Woessner, P.A.

(57) ABSTRACT

A server with a tile construction module has instructions executed by a processor to collect communication threads associated with a user. Tiles representative of the communication threads are dynamically configured in accordance with specified policies to form a tile configuration. The tile configuration is supplied to the user.

17 Claims, 6 Drawing Sheets

Related U.S. Application Data continuation of application No. 14/274,627, filed on May 9, 2014, now Pat. No. 9,276,886.

(51) Int. Cl.
  *G06F 3/04847* (2022.01)
  *G06F 3/04817* (2022.01)
  *G06F 3/04883* (2022.01)

(56) References Cited

U.S. PATENT DOCUMENTS

| | | | |
|---|---|---|---|
| 5,838,317 A * | 11/1998 | Bolnick | G06F 3/005 715/764 |
| 5,999,932 A | 12/1999 | Paul | |
| 6,038,295 A | 3/2000 | Mattes | |
| 6,154,764 A | 11/2000 | Nitta et al. | |
| 6,158,044 A | 12/2000 | Tibbetts | |
| 6,167,435 A | 12/2000 | Druckenmiller et al. | |
| 6,204,840 B1 | 3/2001 | Petelycky et al. | |
| 6,205,432 B1 | 3/2001 | Gabbard et al. | |
| 6,216,141 B1 | 4/2001 | Straub et al. | |
| 6,310,694 B1 | 10/2001 | Okimoto et al. | |
| 6,442,590 B1 | 8/2002 | Inala et al. | |
| 6,484,196 B1 | 11/2002 | Maurille | |
| 6,487,586 B2 | 11/2002 | Ogilvie et al. | |
| 6,665,531 B1 | 12/2003 | Soderbacka et al. | |
| 6,701,347 B1 | 3/2004 | Ogilvie | |
| 6,711,608 B1 | 3/2004 | Ogilvie | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 6,980,909 B2 | 12/2005 | Root et al. | |
| 7,004,394 B2 | 2/2006 | Kim | |
| 7,124,164 B1 | 10/2006 | Chemtob | |
| 7,149,893 B1 | 12/2006 | Leonard et al. | |
| 7,173,651 B1 | 2/2007 | Knowles | |
| 7,203,380 B2 | 4/2007 | Chiu et al. | |
| 7,243,163 B1 | 7/2007 | Friend et al. | |
| 7,278,168 B1 | 10/2007 | Chaudhury et al. | |
| 7,356,564 B2 | 4/2008 | Hartselle et al. | |
| 7,376,715 B2 | 5/2008 | Cunningham et al. | |
| 7,411,493 B2 | 8/2008 | Smith | |
| 7,478,402 B2 | 1/2009 | Christensen et al. | |
| 7,496,347 B2 | 2/2009 | Puranik | |
| 7,519,670 B2 | 4/2009 | Hagale et al. | |
| 7,535,890 B2 | 5/2009 | Rojas | |
| 7,607,096 B2 | 10/2009 | Oreizy et al. | |
| 7,703,140 B2 | 4/2010 | Nath et al. | |
| 7,856,449 B1 | 12/2010 | Martino et al. | |
| 7,912,896 B2 | 3/2011 | Wolovitz et al. | |
| 8,001,204 B2 | 8/2011 | Burtner et al. | |
| 8,098,904 B2 | 1/2012 | Ioffe et al. | |
| 8,112,716 B2 | 2/2012 | Kobayashi | |
| 8,131,597 B2 | 3/2012 | Hudetz | |
| 8,170,957 B2 | 5/2012 | Richard | |
| 8,199,747 B2 | 6/2012 | Rojas et al. | |
| 8,214,443 B2 | 7/2012 | Hamburg | |
| 8,238,947 B2 | 8/2012 | Lottin et al. | |
| 8,244,593 B2 | 8/2012 | Klinger et al. | |
| 8,276,092 B1 | 9/2012 | Narayanan et al. | |
| 8,279,319 B2 | 10/2012 | Date | |
| 8,312,086 B2 | 11/2012 | Velusamy et al. | |
| 8,312,097 B1 | 11/2012 | Siegel et al. | |
| 8,332,475 B2 | 12/2012 | Rosen et al. | |
| 8,379,130 B2 | 2/2013 | Forutanpour et al. | |
| 8,405,773 B2 | 3/2013 | Hayashi et al. | |
| 8,418,067 B2 | 4/2013 | Cheng et al. | |
| 8,428,453 B1 | 4/2013 | Spiegel et al. | |
| 8,471,914 B2 | 6/2013 | Sakiyama et al. | |
| 8,560,612 B2 | 10/2013 | Kilmer et al. | |
| 8,570,907 B2 | 10/2013 | Garcia, Jr. et al. | |
| 8,687,021 B2 | 4/2014 | Bathiche et al. | |
| 8,718,333 B2 | 5/2014 | Wolf et al. | |
| 8,724,622 B2 | 5/2014 | Rojas | |
| 8,744,523 B2 | 6/2014 | Fan et al. | |
| 8,745,132 B2 | 6/2014 | Obradovich | |
| 8,775,407 B1 | 7/2014 | Huang | |
| 8,775,972 B2 | 7/2014 | Spiegel | |
| 8,788,680 B1 | 7/2014 | Naik | |
| 8,797,415 B2 | 8/2014 | Arnold | |
| 8,856,349 B2 | 10/2014 | Jain et al. | |
| 8,874,677 B2 | 10/2014 | Rosen et al. | |
| 8,909,679 B2 | 12/2014 | Root et al. | |
| 8,909,714 B2 | 12/2014 | Agarwal et al. | |
| 8,909,725 B1 | 12/2014 | Sehn | |
| 8,914,752 B1 | 12/2014 | Spiegel | |
| 8,995,433 B2 | 3/2015 | Rojas | |
| 9,026,943 B1 | 5/2015 | Spiegel | |
| 9,037,577 B1 | 5/2015 | Saylor et al. | |
| 9,040,574 B2 | 5/2015 | Wang et al. | |
| 9,055,416 B2 | 6/2015 | Rosen et al. | |
| 9,083,770 B1 | 7/2015 | Drose et al. | |
| 9,094,137 B1 | 7/2015 | Sehn et al. | |
| 9,098,832 B1 | 8/2015 | Scardino | |
| 9,100,806 B2 | 8/2015 | Rosen et al. | |
| 9,100,807 B2 | 8/2015 | Rosen et al. | |
| 9,113,301 B1 | 8/2015 | Spiegel et al. | |
| 9,148,424 B1 | 9/2015 | Yang | |
| 9,191,776 B2 | 11/2015 | Root et al. | |
| 9,204,252 B2 | 12/2015 | Root | |
| 9,225,805 B2 | 12/2015 | Kujawa et al. | |
| 9,225,897 B1 | 12/2015 | Sehn et al. | |
| 9,237,202 B1 | 1/2016 | Sehn | |
| 9,264,463 B2 | 2/2016 | Rubinstein et al. | |
| 9,276,886 B1 | 3/2016 | Samaranayake | |
| 9,294,425 B1 | 3/2016 | Son | |
| 9,385,983 B1 | 7/2016 | Sehn | |
| 9,396,354 B1 | 7/2016 | Murphy et al. | |
| 9,407,712 B1 | 8/2016 | Sehn | |
| 9,407,816 B1 | 8/2016 | Sehn | |
| 9,430,783 B1 | 8/2016 | Sehn | |
| 9,443,227 B2 | 9/2016 | Evans et al. | |
| 9,482,882 B1 | 11/2016 | Hanover et al. | |
| 9,482,883 B1 | 11/2016 | Meisenholder | |
| 9,489,661 B2 | 11/2016 | Evans et al. | |
| 9,491,134 B2 | 11/2016 | Rosen et al. | |
| 9,532,171 B2 | 12/2016 | Allen et al. | |
| 9,537,811 B2 | 1/2017 | Allen et al. | |
| 9,560,006 B2 | 1/2017 | Prado et al. | |
| 9,628,950 B1 | 4/2017 | Noeth et al. | |
| 9,652,896 B1 | 5/2017 | Jurgenson et al. | |
| 9,659,244 B2 | 5/2017 | Anderton et al. | |
| 9,693,191 B2 | 6/2017 | Sehn | |
| 9,705,831 B2 | 7/2017 | Spiegel | |
| 9,742,713 B2 | 8/2017 | Spiegel et al. | |
| 9,785,796 B1 | 10/2017 | Murphy et al. | |
| 9,825,898 B2 | 11/2017 | Sehn | |
| 9,854,219 B2 | 12/2017 | Sehn | |
| 9,961,520 B2 | 5/2018 | Brooks et al. | |
| 10,817,156 B1 | 10/2020 | Samaranayake | |
| 2002/0047868 A1 | 4/2002 | Miyazawa | |
| 2002/0120869 A1 | 8/2002 | Engstrom | |
| 2002/0122659 A1 | 9/2002 | Mcgrath et al. | |
| 2002/0144154 A1 | 10/2002 | Tomkow | |
| 2003/0016247 A1 | 1/2003 | Lai et al. | |
| 2003/0052925 A1 | 3/2003 | Daimon et al. | |
| 2003/0112266 A1 | 6/2003 | Chang et al. | |
| 2003/0126215 A1 | 7/2003 | Udell | |
| 2003/0164856 A1 | 9/2003 | Prager et al. | |
| 2003/0217106 A1 | 11/2003 | Adar et al. | |
| 2004/0027371 A1 | 2/2004 | Jaeger | |
| 2004/0111467 A1 | 6/2004 | Willis | |
| 2004/0203959 A1 | 10/2004 | Coombes | |
| 2004/0243531 A1 | 12/2004 | Dean | |
| 2005/0078804 A1 | 4/2005 | Yomoda | |
| 2005/0097176 A1 | 5/2005 | Schatz et al. | |
| 2005/0104976 A1 | 5/2005 | Currans | |
| 2005/0114783 A1 | 5/2005 | Szeto | |
| 2005/0122405 A1 | 6/2005 | Voss et al. | |
| 2005/0144561 A1 | 6/2005 | Moody et al. | |
| 2005/0193340 A1 | 9/2005 | Amburgey et al. | |
| 2005/0193345 A1 | 9/2005 | Klassen et al. | |
| 2005/0198128 A1 | 9/2005 | Anderson | |
| 2005/0223066 A1 | 10/2005 | Buchheit et al. | |

(56) References Cited

U.S. PATENT DOCUMENTS

| | | |
|---|---|---|
| 2006/0019639 A1 | 1/2006 | Adams et al. |
| 2006/0095514 A1 | 5/2006 | Wang et al. |
| 2006/0114338 A1 | 6/2006 | Rothschild |
| 2006/0242239 A1 | 10/2006 | Morishima et al. |
| 2006/0270419 A1 | 11/2006 | Crowley et al. |
| 2006/0277496 A1* | 12/2006 | Bier .................... G06T 11/206 715/810 |
| 2007/0038702 A1 | 2/2007 | Taylor et al. |
| 2007/0038715 A1 | 2/2007 | Collins et al. |
| 2007/0040931 A1 | 2/2007 | Nishizawa |
| 2007/0064899 A1 | 3/2007 | Boss et al. |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0055269 A1 | 3/2008 | Lemay et al. |
| 2008/0104503 A1 | 5/2008 | Beall et al. |
| 2008/0120409 A1 | 5/2008 | Sun et al. |
| 2008/0207176 A1 | 8/2008 | Brackbill et al. |
| 2008/0222545 A1 | 9/2008 | Lemay |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0306826 A1 | 12/2008 | Kramer et al. |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0132453 A1 | 5/2009 | Hangartner et al. |
| 2009/0132665 A1 | 5/2009 | Thomsen et al. |
| 2009/0158441 A1 | 6/2009 | Mohler et al. |
| 2009/0160970 A1 | 6/2009 | Fredlund et al. |
| 2009/0177704 A1 | 7/2009 | Consul et al. |
| 2009/0248751 A1 | 10/2009 | Myman et al. |
| 2009/0265647 A1 | 10/2009 | Martin et al. |
| 2010/0082427 A1 | 4/2010 | Burgener et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0099507 A1 | 4/2011 | Nesladek et al. |
| 2011/0102605 A1 | 5/2011 | Hannaford |
| 2011/0102630 A1 | 5/2011 | Rukes |
| 2011/0141025 A1 | 6/2011 | Tsai |
| 2011/0145564 A1 | 6/2011 | Moshir et al. |
| 2011/0184980 A1 | 7/2011 | Jeong et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0273575 A1 | 11/2011 | Lee |
| 2011/0283188 A1 | 11/2011 | Farrenkopf |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0163664 A1 | 6/2012 | Zhu |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0209921 A1 | 8/2012 | Adafin et al. |
| 2012/0209924 A1 | 8/2012 | Evans et al. |
| 2012/0210244 A1 | 8/2012 | De Francisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0281129 A1 | 11/2012 | Wang et al. |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0085334 A1 | 3/2014 | Payne |
| 2014/0089314 A1 | 3/2014 | Iizuka et al. |
| 2014/0100997 A1 | 4/2014 | Mayerle et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |

(56) References Cited

U.S. PATENT DOCUMENTS

| | | | |
|---|---|---|---|
| 2014/0173457 | A1 | 6/2014 | Wang et al. |
| 2014/0189592 | A1 | 7/2014 | Benchenaa et al. |
| 2014/0201527 | A1 | 7/2014 | Krivorot |
| 2014/0207679 | A1 | 7/2014 | Cho |
| 2014/0214471 | A1 | 7/2014 | Schreiner, III |
| 2014/0279436 | A1 | 9/2014 | Dorsey et al. |
| 2014/0280537 | A1 | 9/2014 | Pridmore et al. |
| 2014/0282096 | A1 | 9/2014 | Rubinstein et al. |
| 2014/0029821 | A1 | 10/2014 | Park et al. |
| 2014/0317302 | A1 | 10/2014 | Naik |
| 2014/0325383 | A1 | 10/2014 | Brown et al. |
| 2014/0359024 | A1 | 12/2014 | Spiegel |
| 2014/0359032 | A1 | 12/2014 | Spiegel et al. |
| 2015/0026612 | A1 | 1/2015 | Stahl et al. |
| 2015/0046278 | A1 | 2/2015 | Pei et al. |
| 2015/0094106 | A1 | 4/2015 | Grossman et al. |
| 2015/0116529 | A1 | 4/2015 | Wu et al. |
| 2015/0172534 | A1 | 6/2015 | Miyakawa et al. |
| 2015/0180845 | A1 | 6/2015 | Uomini |
| 2015/0199082 | A1 | 7/2015 | Scholler et al. |
| 2015/0222814 | A1 | 8/2015 | Li et al. |
| 2015/0227602 | A1 | 8/2015 | Ramu et al. |
| 2016/0006927 | A1 | 1/2016 | Sehn |
| 2016/0085773 | A1 | 3/2016 | Chang et al. |
| 2016/0085863 | A1 | 3/2016 | Allen et al. |
| 2016/0086670 | A1 | 3/2016 | Gross et al. |
| 2016/0099901 | A1 | 4/2016 | Allen et al. |
| 2016/0180887 | A1 | 6/2016 | Sehn |
| 2016/0277419 | A1 | 9/2016 | Allen et al. |
| 2016/0321708 | A1 | 11/2016 | Sehn |
| 2016/0359957 | A1 | 12/2016 | Laliberte |
| 2016/0359987 | A1 | 12/2016 | Laliberte |
| 2017/0161382 | A1 | 6/2017 | Ouimet et al. |
| 2017/0263029 | A1 | 9/2017 | Yan et al. |
| 2017/0287006 | A1 | 10/2017 | Azmoodeh et al. |
| 2017/0295250 | A1 | 10/2017 | Samaranayake et al. |
| 2017/0374003 | A1 | 12/2017 | Allen et al. |
| 2017/0374508 | A1 | 12/2017 | Davis et al. |

FOREIGN PATENT DOCUMENTS

| | | | |
|---|---|---|---|
| EP | 2482537 | A1 | 8/2012 |
| KR | 20120003323 | A | 1/2012 |
| WO | WO-2012000107 | A1 | 1/2012 |
| WO | WO-2013008238 | A1 | 1/2013 |
| WO | WO-2013008251 | A2 | 1/2013 |
| WO | WO-2014194262 | A2 | 12/2014 |
| WO | WO-2015192026 | A1 | 12/2015 |
| WO | WO-2016007285 | A1 | 1/2016 |
| WO | WO-2016054562 | A1 | 4/2016 |
| WO | WO-2016065131 | A1 | 4/2016 |
| WO | WO-2016/112299 | A1 | 7/2016 |
| WO | WO-2016179166 | A1 | 11/2016 |
| WO | WO-2016179235 | A1 | 11/2016 |
| WO | WO-2017176739 | A1 | 10/2017 |
| WO | WO-2017176992 | A1 | 10/2017 |
| WO | WO-2018005644 | A1 | 1/2018 |

OTHER PUBLICATIONS

U.S. Appl. No. 15/002,228 U.S. Pat. No. 10,817,156, filed Jan. 20, 2016, Dynamic Configuration of Application Component Tiles.
"Android Getting Started Guide", Voxer Business, [Online] Retrieved from the Internet: <URL: https://voxer.com/assets/AndroidGuide.pdf>, (Feb. 1, 2014), 18 pgs.
"U.S. Appl. No. 14/274,627, Advisory Action dated Feb. 11, 2015", 4 pgs.
"U.S. Appl. No. 14/274,627, Advisory Action dated Jul. 8, 2015", 4 pgs.
"U.S. Appl. No. 14/274,627, Decision on Pre-Appeal Brief mailed Aug. 18, 2015", 2 pgs.
"U.S. Appl. No. 14/274,627, Final Office Action dated Jan. 2, 2015", 19 pgs.
"U.S. Appl. No. 14/274,627, Final Office Action dated Jun. 10, 2015", 24 pgs.
"U.S. Appl. No. 14/274,627, Non Final Office Action dated Apr. 27, 2015", 20 pgs.
"U.S. Appl. No. 14/274,627, Non Final Office Action dated Aug. 19, 2014", 19 pgs.
"U.S. Appl. No. 14/274,627, Notice of Allowance dated Dec. 18, 2015", 10 pgs.
"U.S. Appl. No. 14/274,627, Pre-Appeal Brief Request filed Jul. 30, 2015", 5 pgs.
"U.S. Appl. No. 14/274,627, Response filed Jan. 16, 2015 to Final Office Action dated Jan. 2, 2015", 5 pgs.
"U.S. Appl. No. 14/274,627, Response filed Feb. 25, 2015 to Advisory Action dated Feb. 11, 2015", 7 pgs.
"U.S. Appl. No. 14/274,627, Response filed Apr. 30, 2015 to Non Final Office Action dated Apr. 27, 2015", 6 pgs.
"U.S. Appl. No. 14/274,627, Response filed Jun. 19, 2015 to Final Office Action dated Jun. 10, 2015", 6 pgs.
"U.S. Appl. No. 14/274,627, Response filed Sep. 9, 2015 to Advisory Action dated Jul. 8, 2015", 8 pgs.
"U.S. Appl. No. 14/274,627, Response filed Sep. 26, 2014 to Non Final Office Action dated Aug. 19, 2014", 6 pgs.
"U.S. Appl. No. 15/002,228, Final Office Action dated Jun. 13, 2019", 30 pgs.
"U.S. Appl. No. 15/002,228, Non Final Office Action dated Jan. 9, 2020", 25 pgs.
"U.S. Appl. No. 15/002,228, Non Final Office Action dated Sep. 7, 2018", 29 pgs.
"U.S. Appl. No. 15/002,228, Notice of Allowance dated Jun. 25, 2020", 10 pgs.
"U.S. Appl. No. 15/002,228, Response filed Mar. 7, 2019 to Non Final Office Action dated Sep. 7, 2018", 12 pgs.
"U.S. Appl. No. 15/002,228, Response filed Apr. 9, 2020 to Non Final Office Action dated Jan. 9, 2020", 8 pgs.
"U.S. Appl. No. 15/002,228, Response filed Dec. 13, 2019 to Final Office Action dated Jun. 13, 2019", 9 pgs.
"European Application Serial No. 14804343.3, Supplementary European Search Report dated Sep. 29, 2016", 11 pgs.
"European Application Serial No. 15819676.6, Extended European Search Report dated Oct. 12, 2017", 8 pgs.
"How Snaps Are Stored And Deleted", Snapchat, [Online] Retrieved from the Internet: <URL: https://www.snap.com/en-US/news/post/how-snaps-are-stored-and-deleted/>, (May 9, 2013), 2 pgs.
"International Application Serial No. PCT/US2014/040346, International Search Report dated Mar. 23, 2015", 2 pgs.
"International Application Serial No. PCT/US2014/040346, Written Opinion dated Mar. 23, 2015", 6 pgs.
"International Application Serial No. PCT/US2015/037251, International Search Report dated Sep. 29, 2015", 2 pgs.
"International Application Serial No. PCT/US2015/037251, Written Opinion dated Sep. 29, 2015", 4 pgs.
"IVisit Mobile: Getting Started", iVisit, [Online] Retrieved from the Internet: <URL: http://web.archive.org/web/20140830174355/http://ivisit.com/support_mobile>, (Dec. 4, 2013), 16 pgs.
Castelluccia, Claude, et al., "EphPub: Toward robust Ephemeral Publishing", 19th IEEE International Conference on Network Protocols (ICNP), (Oct. 17, 2011), 18 pgs.
Fajman, "An Extensible Message Format for Message Disposition Notifications", Request for Comments: 2298, National Institutes of Health, (Mar. 1998), 28 pgs.
Leyden, John, "This SMS will self-destruct in 40 seconds", [Online] Retrieved from the Internet: <URL: http://www.theregister.co.uk/2005/12/12/stealthtext/>, (Dec. 12, 2005), 1 pg.
Melanson, Mike, "This text message will self destruct in 60 seconds", [Online] Retrieved from the Internet: <URL: http://readwrite.com/2011/02/11/this_text_message_will_self_destruct_in_60_seconds>, (Feb. 18, 2015), 4 pgs.
Sawers, Paul, "Snapchat for iOS Lets You Send Photos to Friends and Set How long They're Visible For", [Online] Retrieved from the Internet: <URL: https://thenextweb.com/apps/2012/05/07/snapchat-for-ios-lets-you-send-photos-to-friends-and-set-how-long-theyre-visible-for/>, (May 7, 2012), 5 pgs.

(56) References Cited

OTHER PUBLICATIONS

Shein, Esther, "Ephemeral Data", Communications of the ACM, vol. 56, No. 9, (Sep. 2013), 3 pgs.
Vaas, Lisa, "StealthText, Should You Choose to Accept It", [Online] Retrieved from the Internet: <URL: http://www.eweek.com/print/c/a/MessagingandCollaboration/StealthTextShouldYouChoosetoAcceptIt>, (Dec. 13, 2005), 2 pgs.

\* cited by examiner

DYNAMIC CONFIGURATION OF APPLICATION COMPONENT TILES

CROSS-REFERENCE TO RELATED APPLICATIONS

This application is a continuation of U.S. patent application Ser. No. 15/002,228, now U.S. Pat. No. 10,817,156, filed on Jan. 20, 2016, which is a continuation of U.S. patent application Ser. No. 14/274,627, now U.S. Pat. No. 9,276,886, filed on May 9, 2014, each of which are incorporated herein by reference in their entireties.

FIELD OF THE INVENTION

This invention relates generally to mobile device applications operative in a networked environment. More particularly, this invention relates to dynamically configuring application component tiles.

BACKGROUND OF THE INVENTION

Mobile devices have limited display space. Many mobile device applications have a variety of changing content. Presenting such changing content to a user is a challenge.

In view of the foregoing, it would be desirable to provide new techniques for dynamically configuring application content and supporting the manipulation of such content by a user.

SUMMARY OF THE INVENTION

A server with a tile construction module has instructions executed by a processor to collect communication threads associated with a user. Tiles representative of the communication threads are dynamically configured in accordance with specified policies to form a tile configuration. The tile configuration is supplied to the user.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
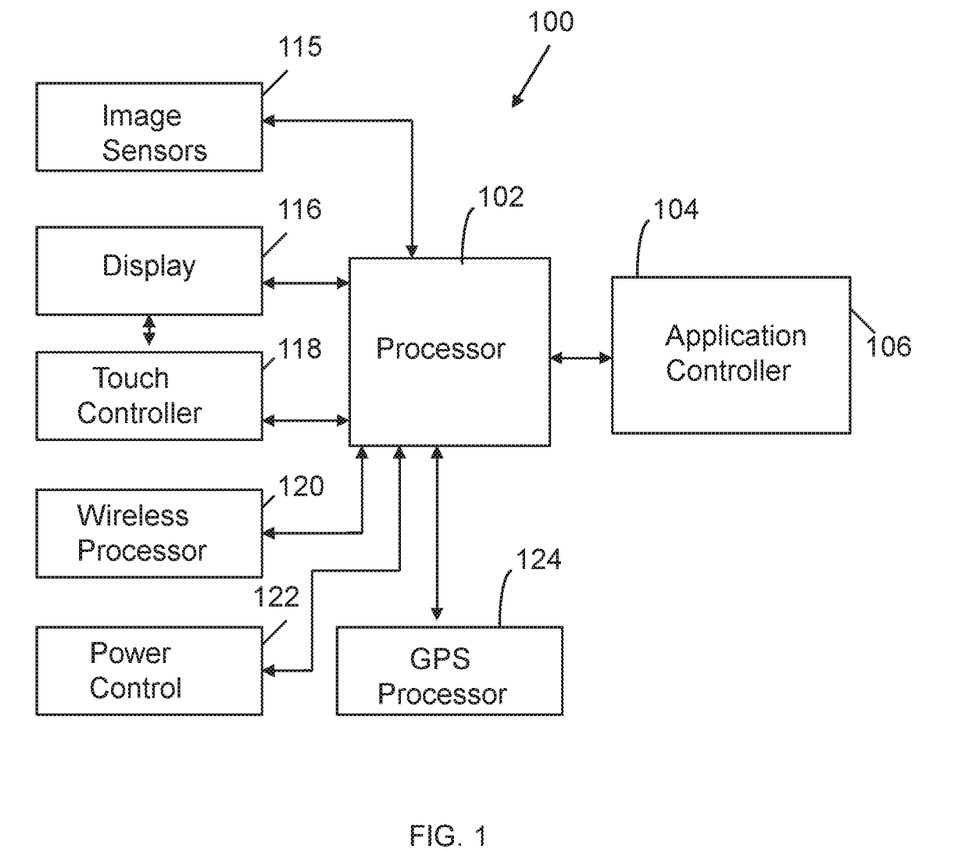
FIG. 1 illustrates an electronic device utilized in accordance with an embodiment of the invention.

FIG. 1 illustrates an electronic device 100 utilized in accordance with an embodiment of the invention. In one embodiment, the electronic device 100 is a Smartphone with a processor 102 in communication with a memory 104. The processor 102 may be a central processing unit and/or a graphics processing unit. The memory 104 is a combination of flash memory and random access memory. The memory 104 stores an application controller 106. The application controller 106 includes executable instructions to coordinate the display and manipulation of application component tiles. An application component is a discrete application mode or application object. For example, an application component may be an application setting component, an application mode, such as a text mode or a camera mode, while an application object may be data gathered by the application, such as a text conversation or a camera object (e.g., a photograph or video). A tile refers to some visual indication of an application component. The application controller 106 may include executable instructions for dynamic configuration and manipulation of application component tiles, which augments or replaces such processing that is described below in connection with a server based tile construction module.

The processor 102 is also coupled to image sensors 115. The image sensors 115 may be known digital image sensors, such as charge coupled devices. The image sensors capture visual media, which is presented on display 116, as coordinated by the application controller 106.

A touch controller 118 is connected to the display 116 and the processor 102. The touch controller 118 is responsive to haptic signals applied to the display 116. In one embodiment, the application controller 106 monitors signals from the touch controller 118 to coordinate invocation of application component tiles and the reconfiguration of application component tiles. The electronic device 100 may also include other components commonly associated with a Smartphone, such as a wireless signal processor 120 to support wireless communications, a power control circuit 122 and a global positioning system processor 124.

Figure 2:
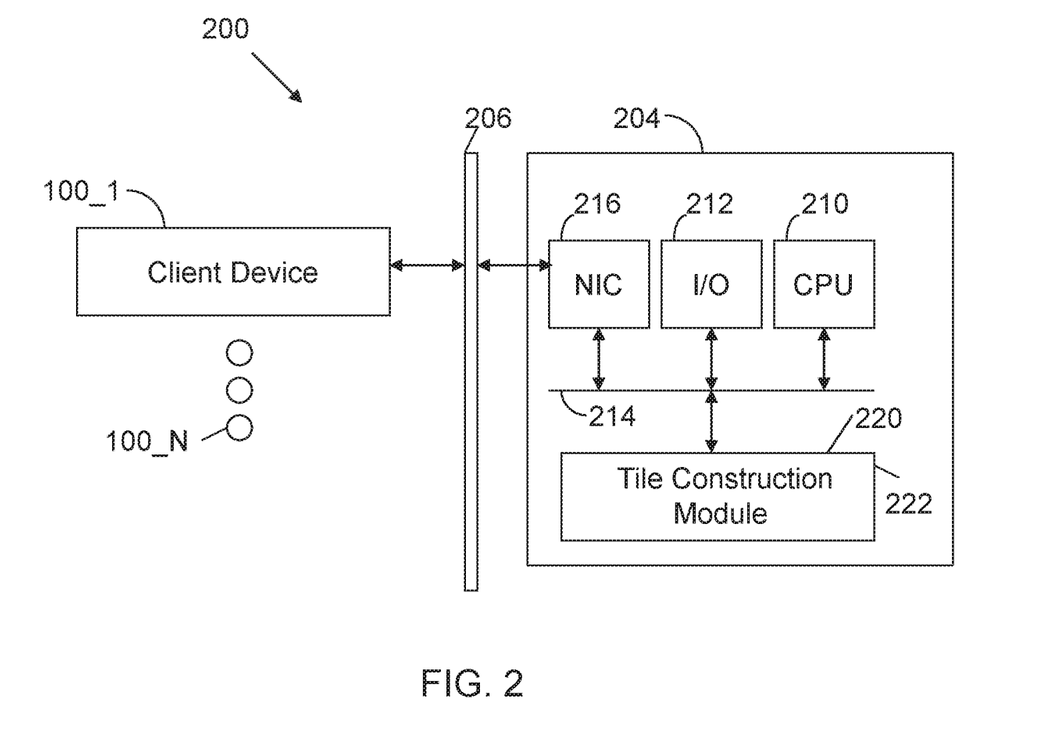
FIG. 2 illustrates a networked system utilized in accordance with an embodiment of the invention.

FIG. 2 illustrates a system 200 configured in accordance with an embodiment of the invention. The system 200 includes a set of client devices 100_1 through 100_N. The client devices 100 are connected to a network 206, which is any combination of wireless and wired network communication devices. A server 204 is also connected to the network 206. The server 204 includes standard components, such as a central processing unit 210 and input/output devices 212 connected via a bus 214. The input/output devices 212 may include a keyboard, mouse, display and the like. A network interface circuit 216 is also connected to the bus 214 to provide connectivity to network 206. A memory 220 is also connected to the bus 214. The memory 220 includes modules with executable instructions, such as a tile construction module 222. The tile construction module 222 implements tile construction and manipulation operations, as discussed below.

Figure 3:
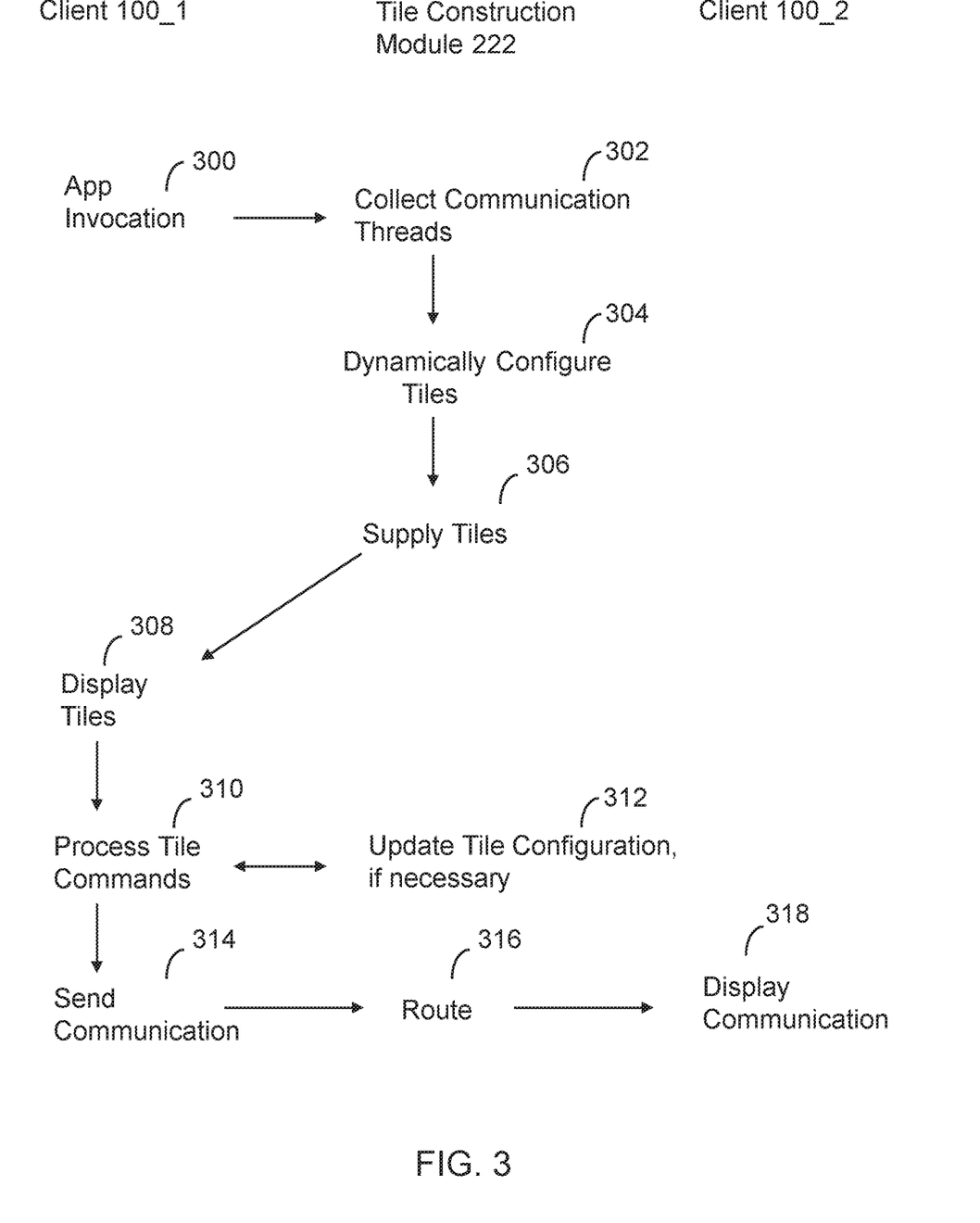
FIG. 3 illustrates processing operations associated with an embodiment of the invention.

FIG. 3 illustrates processing operations associated with an embodiment of the invention. The operations are performed by the tile construction module 222 of server 204 in combination with one or more client devices 100. Initially, an application is invoked 300 on a client device 100_1. For example, the tile construction module 222 may form a segment of a network executed application that coordinates taking photographs and appending messages to such photographs to form application objects for delivery from one user to another. In one embodiment, the application objects are transitory. That is, the application objects are automatically deleted after a specified viewing period. For example, a camera object (e.g., a photograph of video) may have a specified viewing period of five seconds, after which the camera object is automatically deleted. A text conversation thread may have a text entry that is automatically deleted after a specified viewing period. In one embodiment, a user may override the automatic deletion by applying a gesture to the text entry so that the text entry is preserved. It should be appreciated that for transitory application objects of this type a user's content rapidly changes. In particular, new objects are received, they are viewed and they are deleted.

Client 100_1 accesses the tile construction module 222 over network 206. The tile construction module 222 collects communication threads 302 for the user associated with the client device 100_1. The communication threads are application objects associated with the user. The communication threads or application objects may include camera objects (e.g., photographs or videos) and/or text objects (e.g., text threads) associated with the user.

The tile construction module 222 dynamically configures the tiles 304. The dynamic configuration may be informed by certain policies. Policies may specify such parameters as always include an application setting tile and at least one application modality tile. Activation of an application setting tile invokes a setting mode, which allows a user to configure various application settings. Activation of an application modality tile invokes an application modality, such as picture taking, video capture or text session. Another parameter may specify that at least a threshold minimum of conversation tiles be displayed. Another parameter may specify that at least a threshold minimum of camera tiles be presented (where a camera tile represents a digital photograph or a video session). A camera object may have associated text. A conversation tile refers to a text without associated camera content. Another parameter may specify a distribution of conversation tiles and camera tiles in proportion to the respective number of conversation tiles and camera tiles associated with the user.

Figure 4:
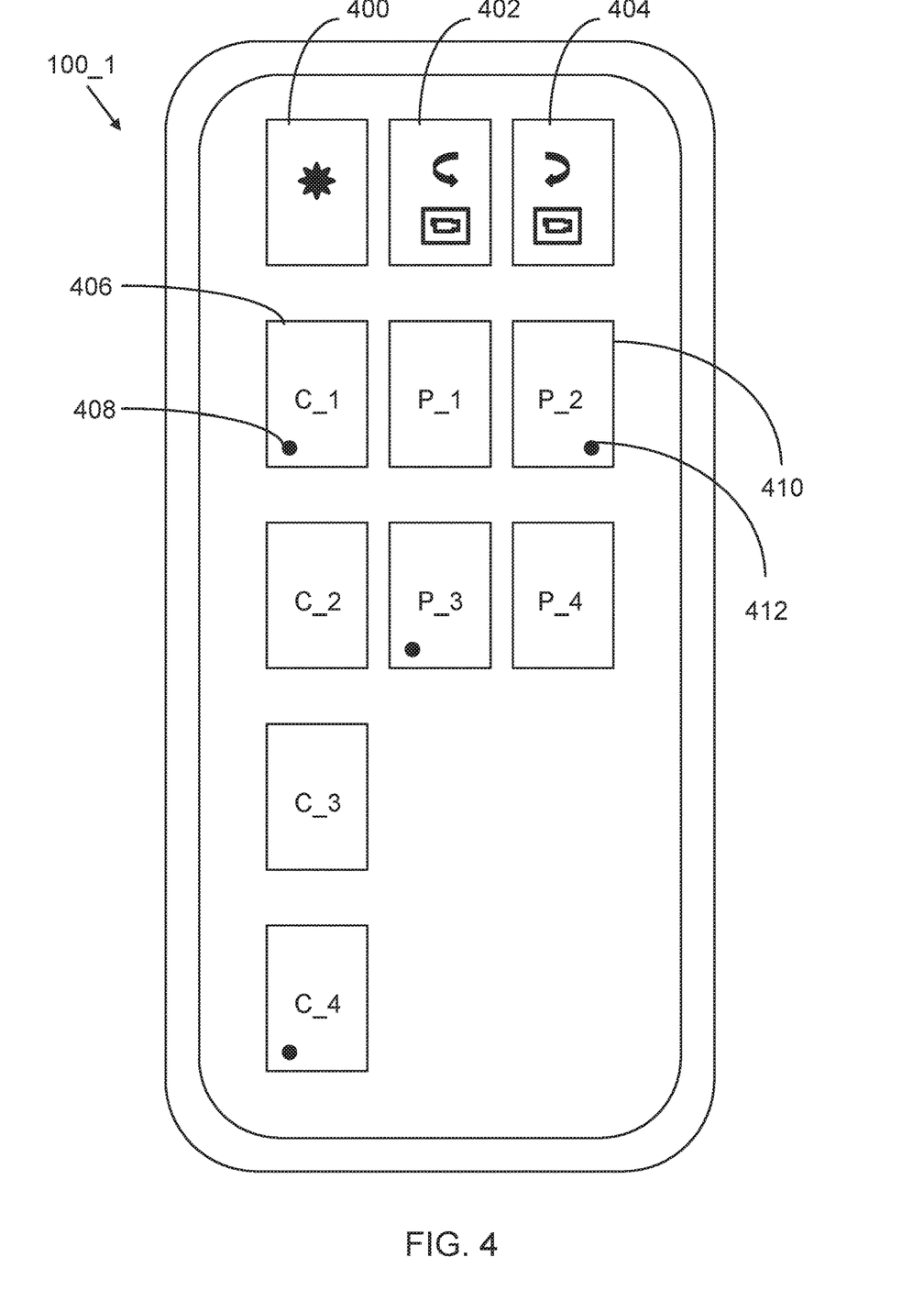
FIG. 4 illustrates dynamically configured application component tiles supplied in accordance with an embodiment of the invention.

After the tiles are dynamically configured, they are supplied to the user 306. The client device 100_1 displays the tiles 308, in coordination with the application controller 106. FIG. 4 illustrates the display of tiles on client device 100_1. The figure illustrates a settings tile 400, a front facing picture taking modality tile 402 and a back facing picture taking modality tile 404. FIG. 4 also illustrates a set of conversation tiles 406, including tiles C_1, C_2, C_3 and C_4. Individual tiles 406 may include notification indicia 408. The notification indicia may specify the last time the conversation was viewed, the number of new conversation entries (e.g., new text messages), and the like. Each conversation tile 406 is usually associated with a conversation thread between the user and one or more other users. FIG. 4 also illustrates a set of camera tiles 410, including tiles P_1, P_2, P_3 and P_4 (where "P" references a picture, which may be a photograph or video). Individual tiles 410 may include notification indicia 412.

Returning to FIG. 3, the next operation is to process tile commands 310. Tile commands may be processed locally by the application controller 106 and/or remotely by the tile construction module 222. For example, if the back facing picture taking modality tile 404 is invoked through a gesture applied to the display of the client device 100_1, then the application controller 106 may locally invoke this mode, as shown in FIG. 5.

Figure 5:
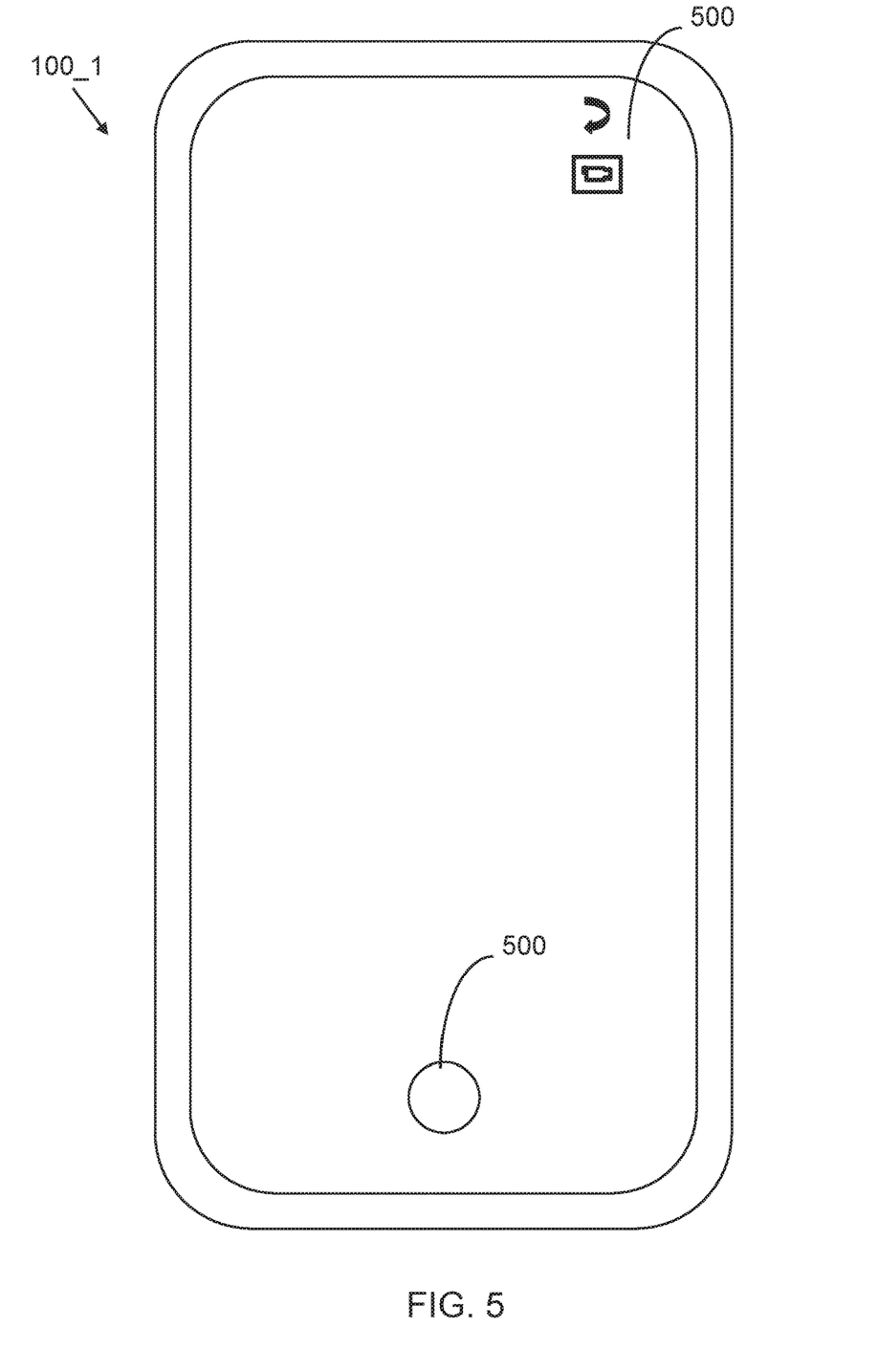
FIG. 5 illustrates an application component mode invoked from an application component tile.

FIG. 5 includes indicia 500 of the back facing picture taking mode. The figure also illustrates a button 500, which may be used to take a camera object (i.e., either a photograph or a video). A specified gesture to the display of FIG. 5 may return the user to the tile display mode. For example, a pinch gesture applied to the screen may return the user to the configuration of FIG. 4.

Other tile processing commands may be coordinated between the application controller 106 and the tile construction module 222. For example, the user may swipe the screen to obtain additional tiles stored by the tile construction module 222. Thus, the tile construction module updates the tile configuration, if necessary 312. The updates may include the collection of communication threads, the dynamic configuration of tiles and the supply of tiles, as was the case when the tiles were initially supplied to the client 100_1.

Figure 6:
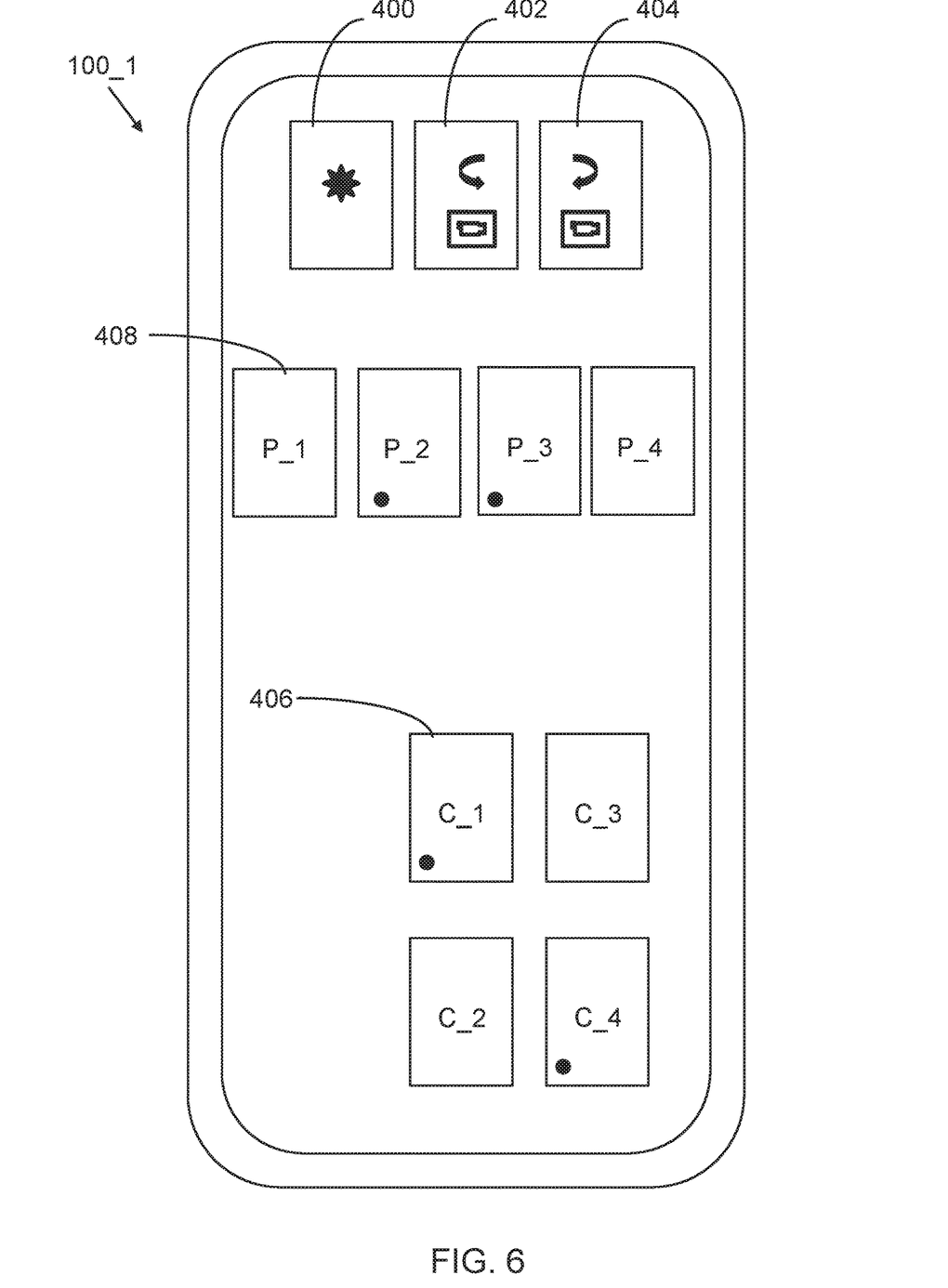
FIG. 6 illustrates user manipulated application component tiles.

FIG. 6 illustrates that the tiles may be configured in any random manner. In FIG. 6, the camera tiles 408 have been placed in a row above a matrix of conversation tiles 406. Individual tiles are moved through haptic engagement and movement of a tile across the screen.

Returning to FIG. 3, a user may send a communication 314. For example, an application modality tile may be invoked to create a text message and/or a camera object (photograph or video). The application mode may utilize various means to specify a communication recipient or recipients. Once recipients are specified, the communication is sent 314. The server 204 routes the communication 316. It may then be displayed 318 on another client device 100_2. Client device 100_2 displays dynamically configured application component tiles, such as shown in FIG. 4.

Advantageously, the disclosed techniques provide an efficient way for navigating an application running on a mobile device with limited screen space. Particularly in the context of a social media application that may involve numerous communication threads, the disclosed technique allows a user to reduce the time spent navigating an application by providing the user with a view of the application that allows selection of a new destination.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method comprising:
    collecting communication threads associated with a user, wherein the communication threads form a social media application comprising a set of conversation tiles and a set of camera tiles that are automatically deleted after a specified viewing period;
    dynamically configuring the set of conversation tiles and the set of camera tiles in accordance with specified policies to form a tile configuration,
    wherein the tile configuration includes an application setting tile for configuring application settings, and
    wherein the specified policies include parameters for respectively specifying a threshold minimum number of tiles for the set of conversation tiles and for the set of camera tiles; and
    supplying the tile configuration to a mobile device associated with the user.

2. The method of claim 1, wherein the set of conversation tiles and the set of camera tiles are automatically deleted after the specified viewing period unless a user overrides automatic deletion by applying a gesture to a text entry within a conversation tile within the set of conversation tiles so that the text entry is preserved.

3. The method of claim 1, wherein the specified policies include a parameter to include at least one application modality tile.

4. The method of claim 1, further comprising:
    coordinating manipulation of the tile configuration with an application controller on a client device.

5. The method of claim 4, wherein the application controller monitors signals from a touch controller to coordinate invocation of application component tiles.

6. The method of claim 5, wherein the touch controller is responsive to haptic signals applied to a display.

7. The method of claim 4, wherein the application controller monitors signals from a touch controller to coordinate reconfiguration of application component tiles.

8. The method of claim 4, wherein the application controller processes tile commands.

9. The method of claim 1, wherein the tile configuration includes notification indicia.

10. The method of claim 1, wherein the set of conversation tiles comprises a set of text threads.

11. The method of claim 1, wherein the set of camera tiles comprises a set of photographs.

12. The method of claim 1, wherein the set of camera tiles comprises a set of videos.

13. The method of claim 1, wherein the tile configuration is configured to be updated in response to a screen swipe.

14. A system comprising:
    a processor; and
    a memory storing instructions that, when executed by the processor, configure the processor to perform operations comprising:
    collecting communication threads associated with a user, wherein the communication threads form a social media application comprising a set of conversation tiles and a set of camera tiles that are automatically deleted after a specified viewing period;
    dynamically configuring the set of conversation tiles and the set of camera tiles in accordance with specified policies to form a tile configuration,
    wherein the tile configuration includes an application setting tile for configuring application settings, and
    wherein the specified policies include parameters for respectively specifying a threshold minimum number of tiles for the set of conversation tiles and for the set of camera tiles; and
    supplying the tile configuration to a mobile device associated with the user.

15. The system of claim 14, wherein the set of conversation tiles and the set of camera tiles are automatically deleted after the specified viewing period unless a user overrides automatic deletion by applying a gesture to a text entry within a conversation tile within the set of conversation tiles so that the text entry is preserved.

16. The system of claim 14, wherein the specified policies include a parameter to include at least one application modality tile.

17. A non-transitory computer-readable storage medium, the computer-readable storage medium including instructions that when executed by a computer, cause the computer to perform operations comprising:
    collecting communication threads associated with a user, wherein the communication threads form a social media application comprising a set of conversation tiles and a set of camera tiles that are automatically deleted after a specified viewing period;
    dynamically configuring the set of conversation tiles and the set of camera tiles in accordance with specified policies to form a tile configuration,
    wherein the tile configuration includes an application setting tile for configuring application settings, and
    wherein the specified policies include parameters for respectively specifying a threshold minimum number of tiles for the set of conversation tiles and for the set of camera tiles; and
    supplying the tile configuration to a mobile device associated with the user.

* * * * *